United States Patent [19]

Krinock

[11] Patent Number: 4,649,536
[45] Date of Patent: Mar. 10, 1987

[54] FLEXIBLE MULTIPLEX SYSTEM FOR TIME DIVISION MULTIPLEX

[75] Inventor: Jerome V. Krinock, Owensboro, Ky.

[73] Assignee: Motorola, Inc., Schaumburg, Ill.

[21] Appl. No.: 778,902

[22] Filed: Sep. 23, 1985

[51] Int. Cl.[4] .............................................. H04J 3/07
[52] U.S. Cl. .................................................... 370/102
[58] Field of Search ................. 370/102, 84, 79, 110.1

[56] References Cited

U.S. PATENT DOCUMENTS

| 3,987,248 | 10/1976 | Platet et al. | 370/102 |
| 4,002,844 | 1/1977 | Doussoux | 370/102 |
| 4,132,862 | 1/1979 | Ferret et al. | 370/102 |
| 4,387,459 | 6/1983 | Huffman | 370/102 |
| 4,397,017 | 8/1983 | Rokugo | 370/102 |
| 4,542,500 | 9/1985 | Jean-Claude | 370/102 |

Primary Examiner—Douglas W. Olms

[57] ABSTRACT

A flexible multiplex system for time-division transmission of one of a selectable number of asynchronous digital signals of nominally equal data rates is described. The apparatus is designed to accommodate asynchronous sources by the use of bit-stuffing, which is coded into the composite signal prior to transmission. The demultiplexer of the system is provided with means for decoding the bit stuffing and delivering the signal to plural outputs available in elastic storage. The multiplex system is designed to accommodate two, three, four, six, eight or twelve input sources in a typical application, the actual selection being made by user accessible selection means. The multiplexed composite bit rate is typically 3 to 19 Mb/sec and the output signal is suited to transmission over digital radio or cable.

3 Claims, 5 Drawing Figures

FLEXIBLE MULTIPLEX SYSTEM FOR TIME DIVISION MULTIPLEX

BACKGROUND OF THE INVENTION

1. Field of the Invention

The invention relates to communication systems in which information from plural digital signal sources is multiplexed into a single channel for transmission and then demultiplexed back into plural digital signals. In particular, the invention relates to such systems in which the signal sources are of nominally the same data rate but not synchronous (i.e. asynchronous), and in which accommodation to a selectable number of signal sources is achieved.

2. Description of Prior Art

The telecommunication industry has standardized multiplex systems accepting two, four and forty-two DS-1 signals, each nominally 1.544 Mb/sec. Six-, eight- and twelve-input multiplexers are also available. This requires a customer with an odd number of DS-1 sources to use the next larger size multiplexer and to tolerate the unused increased bandwidth requirement and decreased reliable range in point-to-point digital radio transmission. The systems, with fixed numbers of channels, require significant equipment replacement when the customer's needs change, restricting the general usefulness of these designs. At the same time, the number of models that must be designed and stocked by the equipment manufacturer to meet the needs of the market is increased, a factor which also reduces the general usefulness of such designs.

While synchronous multiplexers, programmable to a selectable number of sources, are available for lower-speed data communication, none are available for transmission of high-speed asynchronous signals. High-speed transmissions of digital signals greater than a megabit per second are necessarily asynchronous due to the jitter introduced by the digital network. Common causes of this jitter are independent timing sources, multiplex waiting-time jitter and imperfect clock recovery.

SUMMARY OF THE INVENTION

Accordingly, it is an object of the present invention to provide an improved multiplex system for time-division multiplexing.

It is a further object of the invention to provide an improved multiplex system for time-division multiplexing of a selectable number of asynchronous digital signals.

These and other objects of the invention are achieved in a novel multiplex system adapted to be coupled to n digital signal sources and, after multiplexing, transmission and demultiplexing, coupling the separate signals to separate outputs. The multiplex system comprises n signal synchronizers which accept clock and data from n digital signal sources and output data in synchronism with a slightly faster clock from a multiplexer, indicating the resulting bit-slips to the multiplexer. Continuing, the system includes a multiplexer for interleaving the synchronized data signals with control information. After transmission and reception, the demultiplexing means at a second location separates the received bits and clock into the original signals and slip indications. The system is completed by n signal desynchronizers which accept the data, discard bits in accordance with the slip indications, and elastically store the remaining bits to smooth out the discontinuities.

The flexibility in the number n of signal sources is facilitated by using a multiframe structure which is generic to a plurality of n's. The industry-standard framing has been modified to achieve this end. The format may be described as consisting of successive multiframes, each divided into subframes, and each subframe being subdivided into blocks. There are as many subframes as input sources, n. The multiframe marker in the four subframes of the industry-standard four-input multiplexer is given the logical values 0,1,1,X. This is in contrast to the applicant's selection of a multiframe marker which is 1,1 . . . 1,X which is adjustable to any number of subframes and which can be easily aligned by simple demultiplexer circuitry which need not be changed with a change in n.

The applicant's multiplexer comprises three circuit selection means for changing its source capacity n. One means is to set the composite transmit clock frequency in proportion to n. The second means sets the modulus of the counter for interleaving source data bits. The third means sets the modulus of the counter counting the subframes. The applicant's demultiplexer comprises two circuit selection means for changing its output capacity n. One sets the modulus of the counter for distributing data bits to the outputs. The other sets the modulus of the counter counting the subframes.

BRIEF DESCRIPTION OF DRAWINGS

The novel and distinctive features of the invention are set forth in the claims. The invention itself, however, together with further objects and advantages, may best be understood by reference to the following description and accompanying drawings, in which:

FIG. 2A being those elements at a first location terminating with a transmitter, and FIG. 2B being those elements at a second location commencing with a receiver linked in a common digital channel to the transmitter.

DESCRIPTION OF THE PREFERRED EMBODIMENT

Figure 1:
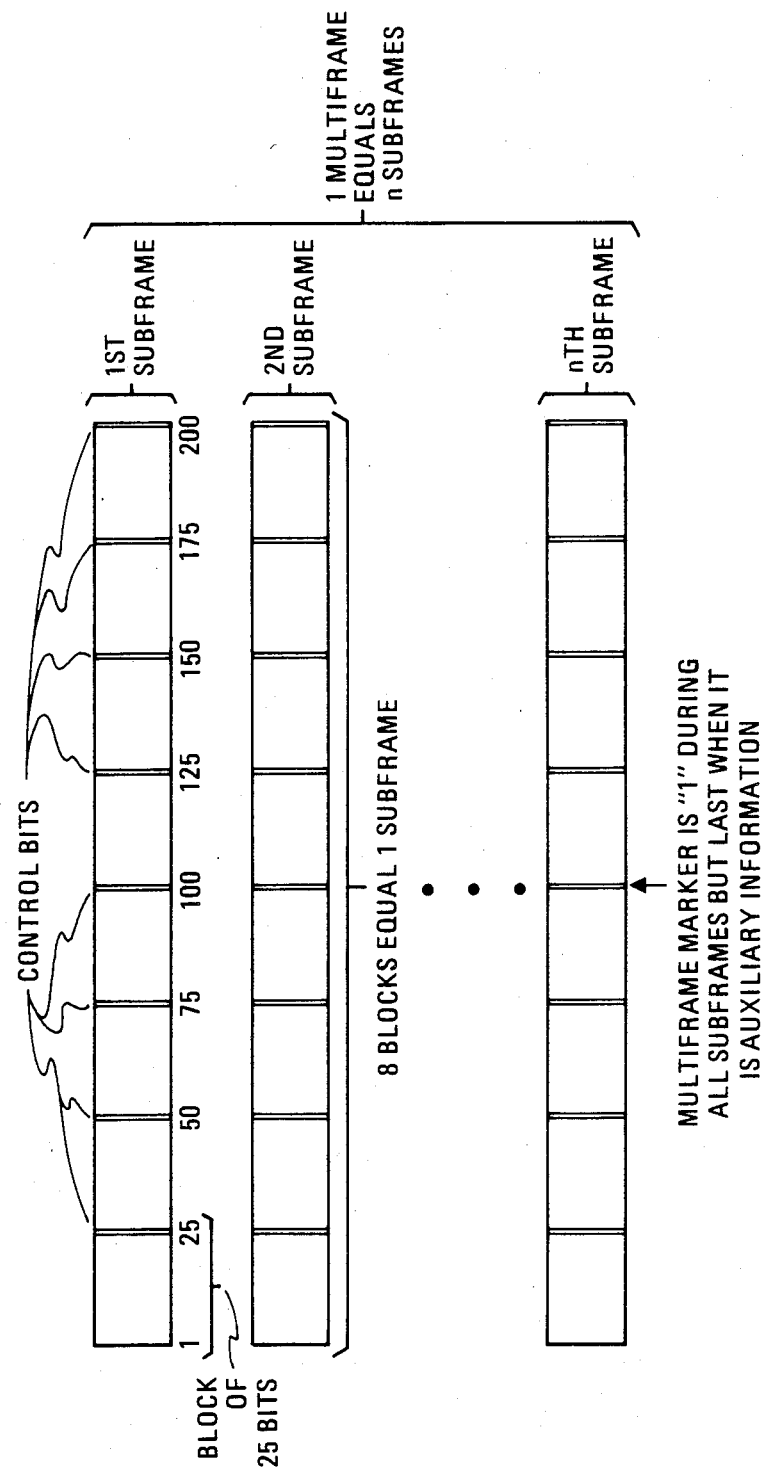
FIG. 1 is an illustration of the framing format used in the present invention over a digital channel of a flexible time division multiplex system.
Figure 2A:
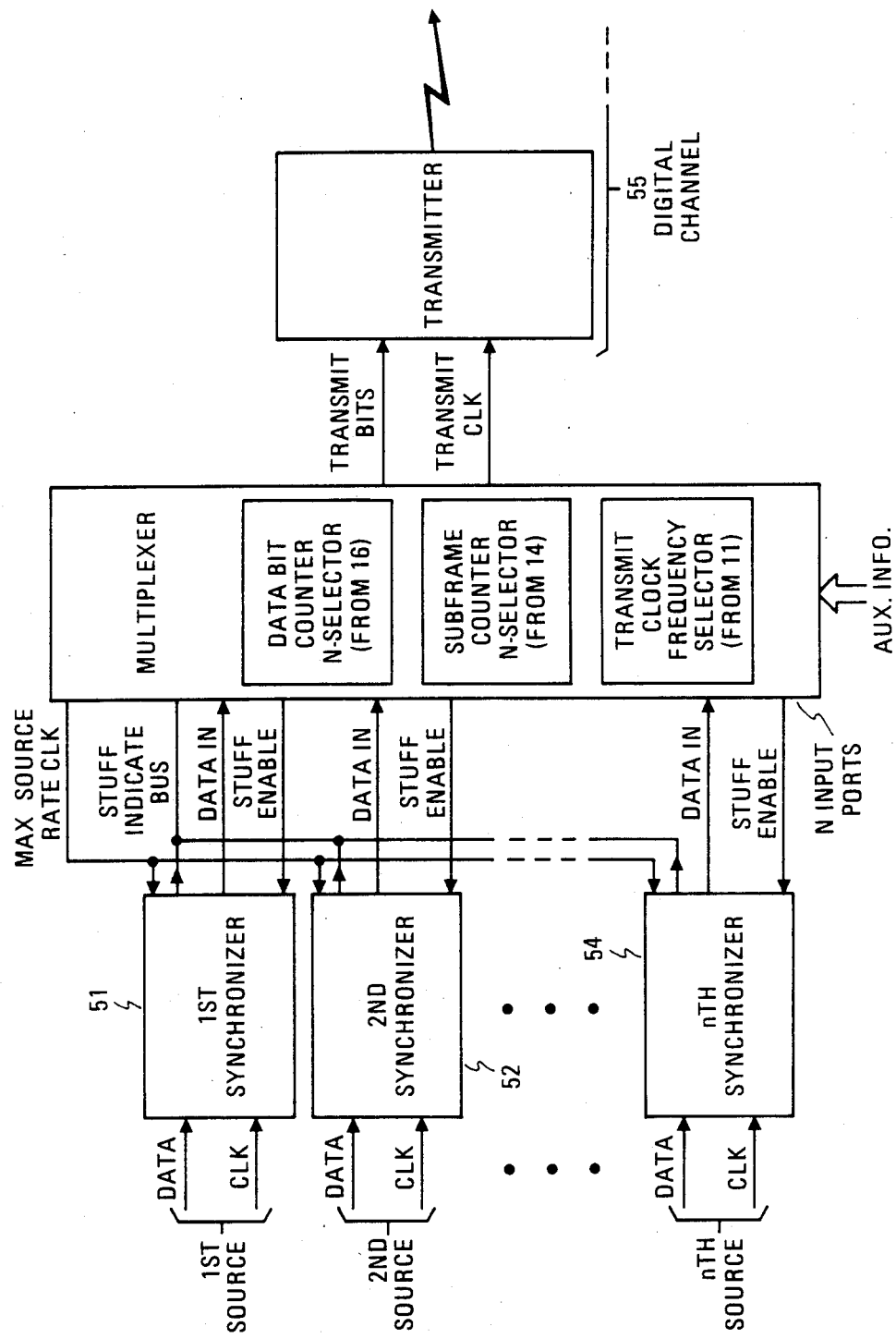
FIGS. 2A and 2B together form a simplified block diagram of the multiplex system as part of a digital communications system.
Figure 2B:
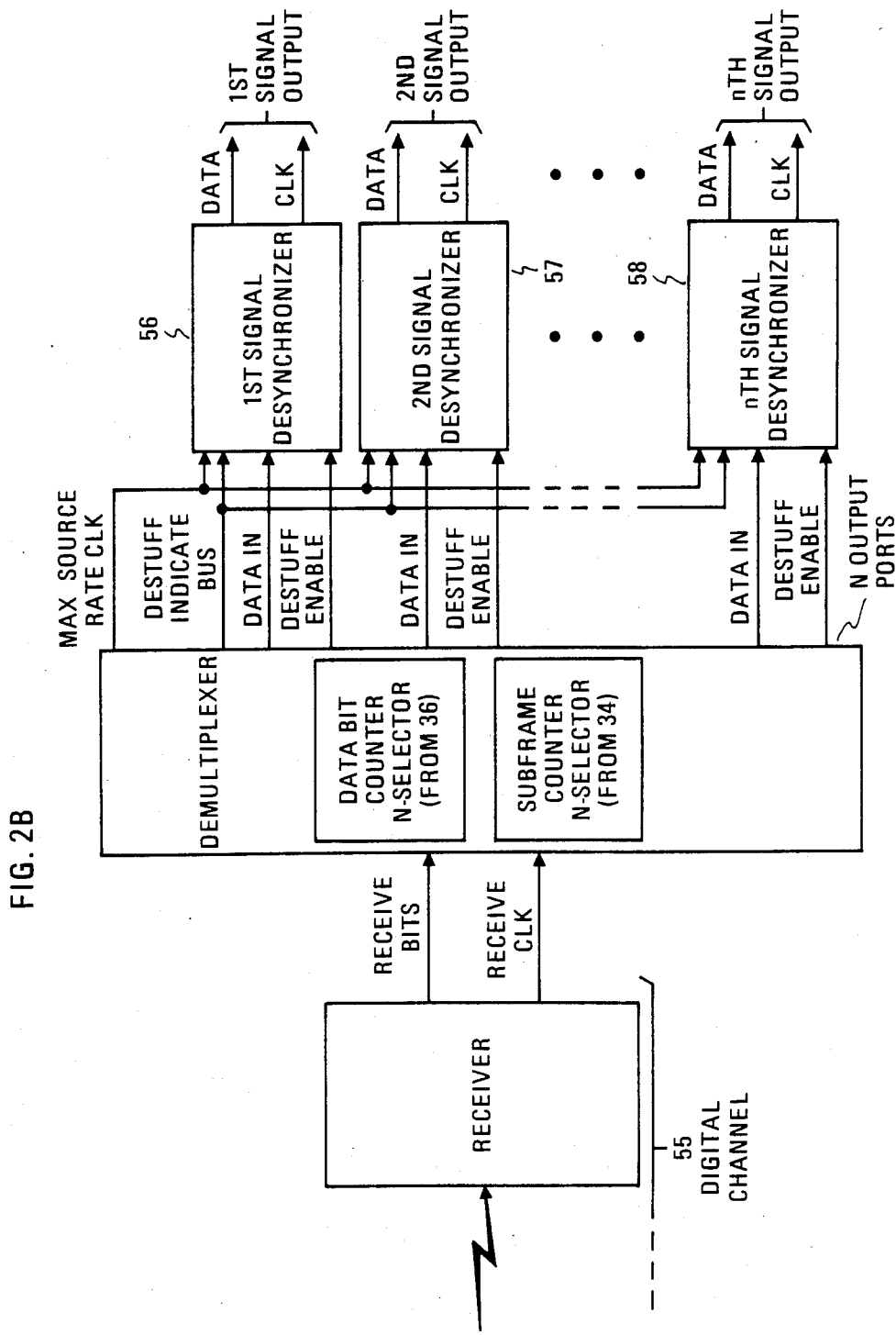
Figure 3:
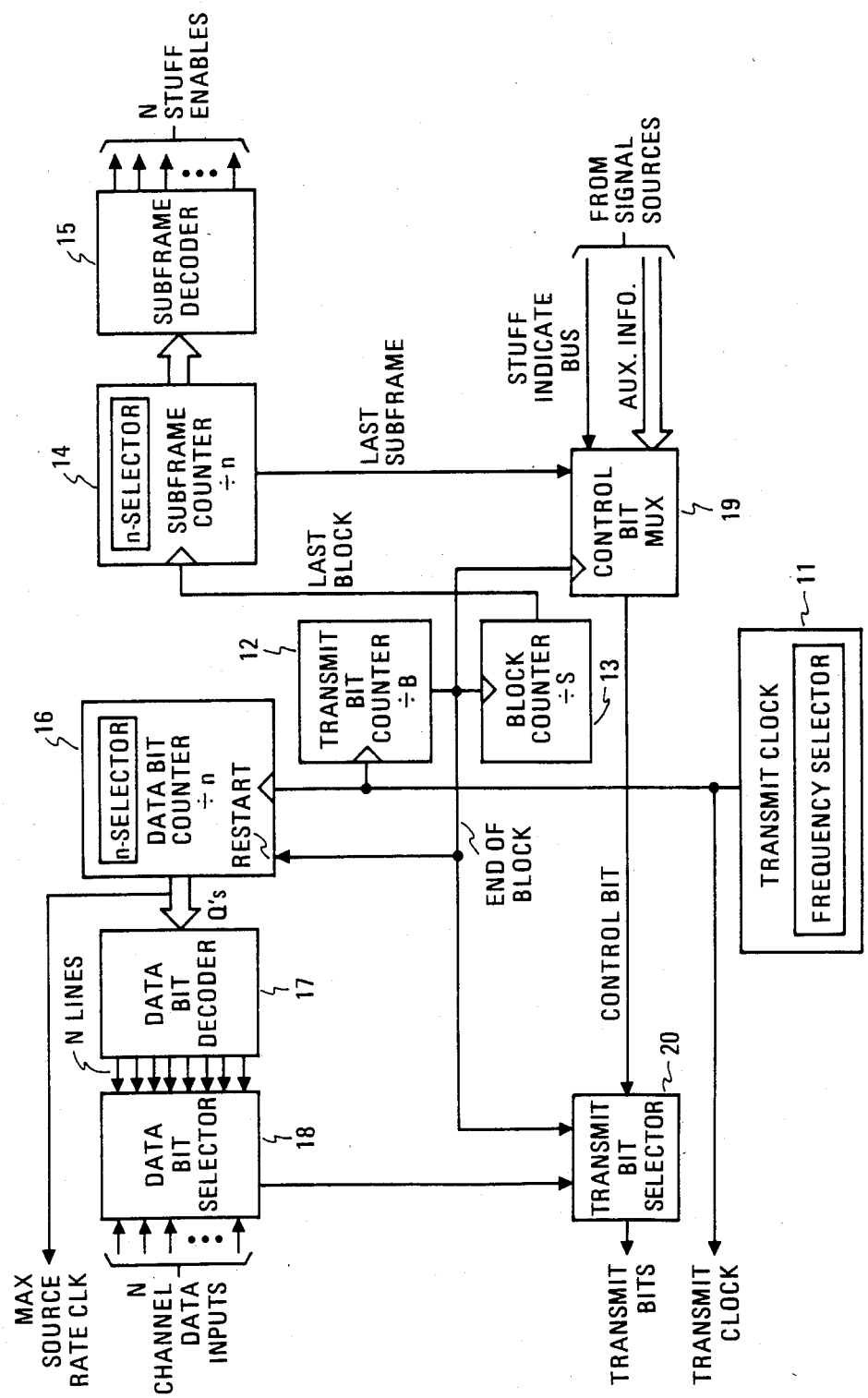
FIG. 3 is a block diagram of the multiplexer used at the transmitting location of the digital communications system.
Figure 4:
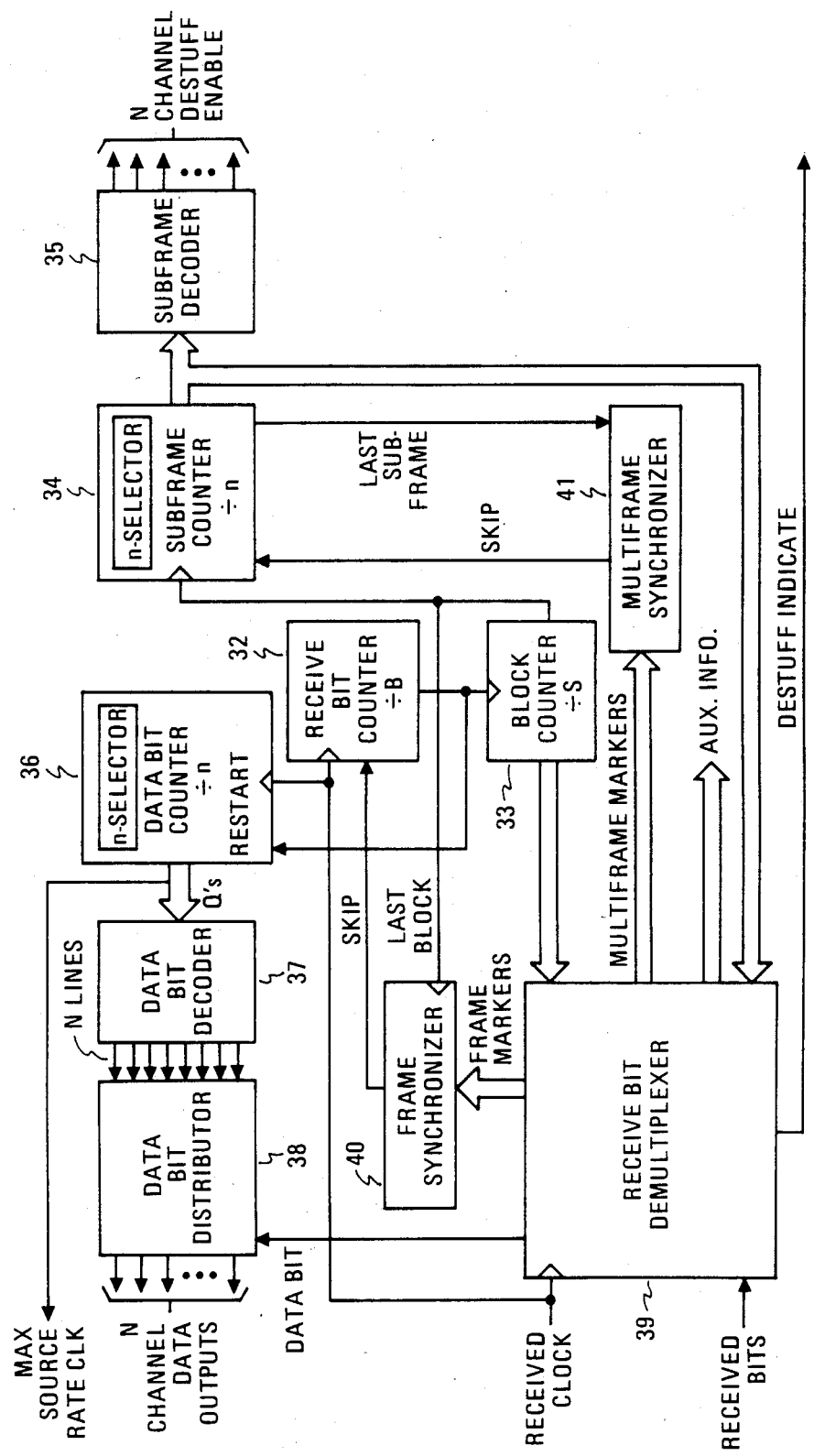
FIG. 4 is a block diagram of the demultiplexer used at the receiving location of the digital communications system.

Referring now to FIG. 1, the framing format, for use in the system depicted in FIGS. 2, 3, 4 is shown. The advantages of the framing format, as set forth earlier, are that it permits flexibility in the selection of the number of channels being multiplexed, in the interests of minimizing the digital channel bit rate for a given number of input signals and allows easy alteration of that number of input signals.

The framing format is seen to comprise a "multiframe" of n subframes. The illustration is of a multiframe, which repeats on the digital channel. The individual subframes, for convenience, are illustrated in a vertical stack of three subframes, terminated by an nth subframe. The subframes contain data bits and control bits. The control bits comprise frame markers, multiframe markers, bit stuff indication, and other auxiliary information. In fact, the subframes follow one another in line without interruption. In the illustration, the multiframe is a succession of n times 200 bits of digital data. Each subframe is in turn divided into an integral number, (e.g. 8) of blocks, each consisting of 25 bits (e.g. 1–25 inclusive, 26–50 inclusive, etc.). Each block includes one control bit in an assigned position in the block. Each control bit in a subframe is assigned one of the functions mentioned above, the last bit in the block being the control bit in the present embodiment. The ratio of control bits to data bits in a block and the number of blocks comprising a subframe must be chosen as a compromise between the jitter performance of the system, the amount of auxiliary information desired to be carried, and the fraction that can be devoted to overhead. The jitter performance of a multiplex system is characterized by its tolerance to input jitter without loss of data, the amount of waiting time jitter that it contributes and the amount of jitter that is transferred from input to output. The relevant issues are treated by F. E. Owen in *PCM AND DIGITAL TRANSMISSION SYSTEMS*, 1982, TEXAS INSTRUMENTS ELECTRONICS SERIES, CHAPTER 7. The positional assignments of the control bits remain the same in each subframe with the exception of the multiframe marker. In the present embodiment, the multiframe markers in all subframes are logical one except for the multiframe marker in the last subframe, which is sometimes a logical zero due to its carriage of auxiliary information. This allows multiframe acqusition, i.e. identification of subframes without ambiguity, by the multiframe synchronizer in the demultiplexer. The other 24 bits in the block are data bits interleaved from each digital signal source in turn. In order that each block contain the same number of bits from each source, the number of data bits in the block must be an integral multiple of the number of sources, n. A highly composite number, that is, one having many integer factors, is desirable, for it allows good flexibility for the system. The present embodiment uses 24, which is an integral multiple of 2, 3, 4, 6, 8, and 12. The transmit clock frequency of the multiplexer (ft) must be set proportional to the number of channels so that the stuffing ratio and the minimum and maximum signal source frequencies remain the same when the number n is changed. Thus the jitter performance of the system is unaffected, and the source synchronizers and desynchronizers need not be changed when n is changed.

In a practical embodiment, the stuffing ratio was desired to be 0.57., meaning that there would be a full 200 transmitted bits minus the 8 control bits or 192 data bits in 57% of the subframes and 191 data bits in 43% of the subframes. This allows a maximum input jitter of $0.43/191 = 0.22\%$ of nominal source frequency. The average number of data bits per subframe is thus 191.57 and the system overhead factor is $200/191.57 = 1.044$. Thus the transmit clock frequency (ft) must be set to $$ft = 1.044 \times n \times (\text{nominal signal source data rate}).$$

For example, six T1 signal sources of 1.544 Mb/sec rate require a transmit clock frequency of 9.6716 MHz.

FIGS. 2A and 2B together form a simplified block diagram of applicant's flexible time-division multiplex system as part of a complete digital communication system including signal sources, source synchronizers, multiplexer, digital channel, demultiplexer, desynchronizers and signal outputs. For purposes of orientation, the drawing illustrates the multiplexer and demultiplexer partially to emphasize those features which enter into providing flexibility in selecting the number of signal sources. The multiplexer and demultiplexer may have up to 12 input and output ports. The number of ports denoting the system input source capacity is N. Only n (e.g. 2, 3, 4, 6, 8, or 12) have desynchronizers connected to them. To put it another way, n must be less than or equal to N.

The block diagram may be seen to comprise n signal sources, each coupled to one of n synchronizers (51–54), a multiplexer, a digital channel (55) comprising a transmitter coupled to a receiver, a demultiplexer, and n signal desynchronizers (56–58) coupling data to n signal outputs. The multiplexer, as partially illustrated, is seen to contain a data-bit-counter n-selector, which, as will be described, is a portion of the data bit counter (block 16 in FIG. 3), a subframe-counter n-selector, a portion of the subframe counter (block 14 of FIG. 3), and a transmit clock frequency selector, a portion of the transmit clock (block 11 of FIG. 3). The demultiplexer, as partially illustrated, is seen to contain a data-bit-counter n-selector, which, as will be described, is a portion of the data bit counter (block 36 in FIG. 4) and a subframe-counter n-selector, a portion of the subframe counter (block 34 of FIG. 4).

As illustrated, the synchronizers receive data and clock from the signal sources. Data is coupled from each synchronizer to its port on the multiplexer at the maximum source rate, which is slightly faster than the nominal source rate by a factor of 192/191.57. The memory in which the data is stored is thus called "elastic" storage. Each synchronizer receives the maximum source rate clock from the multiplexer. Each synchronizer also receives a stuff enable signal from the multiplexer. The stuff enable signals for each signal source are enabled one at a time in a repeating sequence by the multiplexer. Each synchronizer allows bit slips to occur in the output data as required by the output clock rate, but only when its stuff enable input is active. Upon doing so, it also activates the stuff indicate bus to the multiplexer.

Each of the n signal desynchronizers accepts data from one of the N demultiplexer data output ports. These data bits, some of which have been stuffed, are clocked in by the maximum source rate clock provided from the demultiplexer. The desynchronizers discard the stuffed bits in response to the common destuff indicate from the demultiplexer and the destuff enable inputs from their demultiplexer port being simultaneously active.

The stuff indications for each signal source are communicated via the control bits in the digital channel. For example, three of the control bits in each subframe may be reserved for stuff indications from one signal synchronizer. Each multiframe of n subframes thus includes one triply-redundant stuff indication for each of the n signals. Three ones in these control bit positions indicate stuffing while three zeroes indicate no stuffing. This method of communicating stuff indications is described in American Telephone & Telegraph Co. Publication CB-128 available from Bell Communications Research, Morristown, N.J. for a four-signal-source multiplex system.

FIG. 3 shows the functional block diagram of the multiplexer used at the transmitting location of the digital communication system. The block diagram may be seen to consist of ten blocks 11-20. The block diagram of FIG. 2A shows the external connections to the multiplexer whose internal connections are shown in FIG. 3.

The external connections to the multiplexer are shown both in FIGS. 2A and 3. The N signal inputs shown coupled from the synchronizers 51-54 are illustrated in FIG. 3 as coupled to the data bit selector 18. The stuff indicate bus coupled from the n synchronizers 51-54 is illustrated in FIG. 3 as coupled to the control bit multiplexer 19. The N stuff enable lines coupled to the n synchronizers 51-54 are illustrated in FIG. 3 as coupled from the subframe decoder 15. The maximum source rate clock shown coupled to each of the synchronizers 51-54 is illustrated in FIG. 3 as coupled from the data bit counter 16. The transmit bits and the transmit clock shown coupled to the digital channel transmitter are shown in FIG. 3 as coupled from the transmit bit selector 20 and transmit clock 11, respectively.

As shown in FIG. 3, the multiplexing means comprises the transmit clock 11, the transmit bit counter 12, the block counter 13, the subframe counter 14, the subframe decoder 15, the data bit counter 16, the data bit decoder 17, the data bit selector 18, the control bit multiplexer 19 and the transmit bit selector 20.

Blocks 12-14, clocked by block 11, establish the frame structure of the multiplexer. The transmit clock 11 generates a digital clock from an internal crystal oscillator or external source and includes a frequency selector means for varying the clock rate in proportion to the source rate and number of sources, n, as described by the mathemical formula presented earlier. The clock output is coupled to the digital channel transmitter (part of 55) and also to clock the transmit bit counter 12 and data bit counter 16. The transmit bit counter is a binary divider of modulus B, where B is chosen to be the number of bits in a block, e.g. 25. It may be realized using two 74'163 TTL integrated circuits. Its output thus signals the end of each block of 25 bits, which is also where the control bit is to be inserted. The block counter 13 is another binary divider which may be realized using the last three stages of the 74'163 used in the transmit bit counter. The block counter should have a modulus S, e.g. 8, the number of blocks in a subframe. The output of the block counter thus signals the end of the subframe and is coupled to the subframe counter 14, another binary divider which may also be a 74'163 integrated circuit. The modulus of this counter must be selectable for different n's. This may be done by connecting the chip to preset after each carry and providing circuit jumpers to program the preset inputs. The counter states will thus sequence from the preset up to 15; thus the preset should be jumpered to $(15-n+1)$.

The parallel outputs (Q0, Q1, Q2 . . . ) of the integrated circuit are coupled to the subframe decoder 15, a 74'138 integrated circuit(s) which has parallel outputs to enable the bit stuffers on the signal synchronizers 51-54 one at a time, during successive subframes.

Blocks 16-18 are responsible for interleaving the data bits from among the signal synchronizers. The data bit counter 16 is another 74'163 integrated circuit which is clocked by the transmit clock and connected to restart in synchronism with the end of each block via the end-of-block signal from the transmit bit counter 12. The counter must be selectable and may be set to modulus n in the same manner as the subframe counter 14 as explained above, by connecting the chip to preset after each carry, and providing circuit jumpers to program the preset inputs. The counter states will thus sequence from the preset up to 15; thus the preset should be jumpered to $(15-n+1)$. The parallel outputs (Q0, Q1, Q2 . . . ) are coupled to the data bit decoder 17, whose outputs control data bit selector 18, a 74'151 multiplexer chip. Data from each of the n signal synchronizers 51-54 are coupled to its data inputs; thus, its output is an interleaved sequence of data bits from each of the signal sources. The most significant bit output from the counter is in fact the maximum source rate clock, which repeats once every time the counter completes a cycle of taking a data bit from each of the signal sources. This clock is coupled to read data out of the signal synchronizers 51-54.

The control bit multiplexer 19 and transmit bit selector 20 select the proper control bits and insert one of them into the transmit bit stream after every block, e.g. 24 data bits. The clock input from the transmit bit counter 12 is used to step the control bit multiplexer into selecting the next control bit. The control bits include frame markers, multiframe markers, stuff indications and auxiliary information. Note that there are always S, e.g. 8, control bits and S blocks in a subframe; thus, the control bit multiplexer circuitry need not be changed with the number of channels n. The last subframe input from the subframe counter is used to insert the special multiframe marker signifying the last subframe in the multiframe. The auxiliary information required to be transmitted in a particular application will influence the assignment of control bits, but the format must insure that the demultiplexer will recognize the subframe and multiframe without ambiguity for all possible repeating combinations of stuff indications and auxiliary information. In the design of a flexible multiplexer, circuitry is simplified by using a multiframe marker which is fixed during all subframes except the last subframe, during which it is recognizably different. This is true because there is always only one subframe which is "last" regardless of whether there are 2, 3, 4, or n subframes, and the circuitry may pick this out without being changed for each n. In the present embodiment, the assignment of control bits is as follows:

| Block | Control Bit Assignment |
|---|---|
| 1 | Voice service channel bit or logical 1 if voice service channel is not installed |
| 2 | Logical 1, a frame marker |
| 3 | Logical 0, a frame marker |
| 4 | Multiframe marker, logical 1 during all subframes except the last subframe of the multiframe, during which it is used for digital telemetry and control. If the control and telemetry and option is not installed, this is logical 0. |
| 5 | Voice service channel bit or logical 0 if voice service channel is not installed |
| 6-8 | Stuff indications which are all logical 1 to indicate stuff and all logical 0 to indicate no stuff. |

During the initial 24 bits of the block, the interleaved data bits from the data bit selector 18 are coupled to the transmit bit stream. At the end of the block, as signalled from the transmit bit counter 12, the selected control bit is coupled to the transmit bit selector 20, which inserts it into the transmit bit stream.

The composite transmit bit stream is coupled from the transmit bit selector 20 to the transmitter of the digital channel, part of 55.

FIG. 4 shows the functional block diagram of the demultiplexer used at the receiving location of the digital communication system. The block diagram may be seen to consist of ten blocks 32–41. The block diagram of FIG. 2B shows the external connections to the demultiplexer, whose internal connections are shown in FIG. 4.

The external connections to the demultiplexer are shown both in FIGS. 2B and 4. The received bits shown coupled from the digital channel receiver are shown in FIG. 4 to be coupled to the receive bit demultiplexer 39, and the received clock is shown to be coupled to the receive bit counter 32 and data bit counter 36. The N channel data outputs shown coupled to the desynchronizers 56–58 are illustrated in FIG. 4 to be coupled from the data bit distributor 38. The destuff indicate bus coupled to the n desynchronizers 56–58 is illustrated in FIG. 4 to be coupled from the receive bit demultiplexer 39. The N destuff enable lines coupled to the n desynchronizers 56–58 are illustrated in FIG. 4 to be coupled from the subframe decoder 35. The maximum source rate clock shown coupled to each of the desynchronizers 56–58 is illustrated in FIG. 4 to be coupled from the data bit counter 36.

As shown in FIG. 4, the demultiplexing means comprises the receive bit counter 32, the block counter 33, the subframe counter 34, the subframe decoder 35, the data bit counter 36, the data bit decoder 37, the data bit distributor 38, the receive bit demultiplexer 39, the frame synchronizer 40 and the multiframe synchronizer 41.

Blocks 32–34 establish the frame structure of the demultiplexer, reproducing the frame structure of the multiplexer. The receive bit counter is a binary divider of dual moduli B and B−1, where B is chosen to be the number of bits in a block, e.g. 25. The basic counter section may be realized using two 74'163 TTL integrated circuits. To acquire frame synchronization after an incorrect frame has been received, the counter must operate with the reduced modulus B−1, so that, on the next frame, the bit alignment will be displaced by one from the known incorrect position. The basic counter used in the multiplexer may be modified to achieve this function by providing proper combinational logic to increase the presets by one in response to a "skip" input from the frame synchronizer. After frame alignment has been acquired, the output of the receive bit counter thus signals the end of each block of 25 bits, which is also where the control bit is expected. The block counter 33 is another binary divider which may be realized using the last three stages of the 74'163 used in the receive bit counter. The block counter should have a modulus S, e.g. 8, the number of blocks in a subframe. The output of the block counter thus signals the end of the subframe and is coupled to the subframe counter 34, another binary divider which may also be a 74'163 integrated circuit. The modulus of the subframe counter must be selectable for different n's. This may be done by connecting the chip to preset after each carry and providing circuit jumpers to program the preset inputs. The counter states will thus sequence from the preset up to 15; thus the preset should be jumpered to (15−n+1). To acquire multiframe synchronization after an incorrect frame has been received, it is generally necessary to subtract one from the modulus of this counter, so that, on the next multiframe, the subframe alignment will be displaced by one from the known incorrect position. The present subframe counter may by modified to achieve this function. Instead of connecting the preset inputs directly to the circuit jumpers, a 74'151 two-position TTL switch may be inserted with the switch poles connected to the preset inputs of the counter. Two sets of circuit jumpers are provided, one on each of the switch positions. The jumpers connected to the normal position should be preset to (15−n+1) as previously. The jumpers on the other position should be set to (15−n+2). The "skip" input from multiframe synchronizer may then be connected to the 74'151 switch control.

The parallel outputs (Q0, Q1, Q2 . . . ) of the subframe counter are coupled to the subframe decoder 35, a 74'138 integrated circuit(s) which has parallel outputs to enable the bit destuffers on the signal desynchronizers 56–58 one at a time, during successive subframes.

Blocks 36–38 are responsible for distributing the data bits to the proper signal desynchronizers. The data bit counter 16 is another 74'163 integrated circuit, which is clocked by the received clock and connected to restart in synchronism with the end of each block via the end-of-block signal from the receive bit counter 32. The counter must be selectable and set to modulus n in the same manner as the subframe counter 34, as explained above, by connecting the chip to preset after each carry, and providing circuit jumpers to program the preset inputs. The counter states will thus sequence from the preset up to 15; thus the preset should be jumpered to (15−n+1). The parallel outputs (Q0, Q1, Q2 . . . ) are coupled to the data bit decoder 37, whose outputs control the data bit distributor 38, a 74'259 demultiplexer chip. The data bits coupled from the receive bit demultiplexer 39 are distributed to the n signal desynchronizers 56–58 in the same sequence as they were extracted from the signal synchronizers 51–54 at the multiplexer. Thus the data from each of the synchronizers at the transmitter location is communicated in proper sequence to the corresponding signal desynchronizer at the receiver location. The most significant bit output from the counter 36 is in fact the maximum source rate clock, which repeats once every time the counter completes a cycle of distributing a data bit to each of the signal desynchronizers 56–58. This clock is coupled to write data into each of the signal desynchronizers 56–58.

Once frame and multiframe alignment have been acquired, the receive bit demultiplexer 39 separates the received bits into the data bits coupled to the data bit distributor 38, the frame marker bits coupled to the frame synchronizer 40, the multiframe marker bits (including, in this embodiment, the digital telemetry and control) coupled to the multiframe synchronizer 41, the destuff indications coupled to the signal desynchronizers 56–58, and the auxiliary information. The circuitry requires the current block number and current subframe number in order to do this, and these are supplied by the parallel binary outputs from the block counter 33 and subframe counter 34, respectively. Note that, since there are always S, e.g. 8, control bits and S blocks in a subframe, the receive bit demutiplexer, like the control bit multiplexer, need not be changed with the number of channels, n. Again, in the design of a flexible multiplexer, circuitry is simplified by using a multiframe marker which is fixed during all subframes except the last subframe, during which it is recognizably different because there is always only one subframe which is "last," and the receive bit demultiplexer, like the control bit multiplexer, may pick this out without being changed for each n.

The frame synchronizer 40 is fed the two frame markers (e.g. the second and third control bits) after each subframe and, upon subsequent reception of the last-block signal from the block counter, makes a decision as to whether or not the demultiplexer's frame alignment is correct. Some hysteresis should be provided to keep frame alignment from being lost due to occasional bit errors if the digital channel is not error-free. When it has been decided that frame alignment has been lost, the skip signal is coupled to receive bit counter 32, causing its modulus to be reduced by one and the frame alignment to be displaced one bit from the known incorrect position.

The multiframe synchronizer 41 is fed the multiframe marker (e.g. the fourth control bit) after each subframe and, upon subsequent reception of the last-block signal from the block counter, notes whether or not the bit is a correct multiframe marker for all but the last subframe, e.g. logical 1. This notation is inhibited by the application of the last-subframe input from the subframe counter during the last subframe; thus, the bit will always be found correct, e.g. logical 1, after multiframe alignment. It will sometimes be incorrect before multiframe alignment due to the last multiframe marker carrying auxiliary information being aligned in one of the first n−1 positions. In this instance, the multiframe synchronizer will couple a "skip" signal to the subframe counter 34, causing the multiframe alignment to be displaced by one subframe. Some hysteresis should again be provided to keep multiframe alignment from being lost due to occasional bit errors if the digital channel is not error-free.

What is claimed is:

1. A flexible multiplex system for time division multiplexing a selectable number, n, which is less than or equal to the system capacity, N, of asynchronous digital signals having data rates within a specified tolerance of a nominal rate, requiring bit stuffing for synchronizing the signals into a common stream, comprising:
   (a) n signal sources, each providing data and clock signals;
   (b) n signal synchronizers, which accept the data and clock signals from said n signal sources, respectively, and output n synchronized data signals in synchronism with a transmit clock, whose rate is slightly faster than the fastest of said clock signals, indicating with bit-stuff indications when slips have occurred;
   (c) multiplexing means at a first location comprising:
      first means for selecting the number n, said multiplexing means being coupled to the signal synchronizers for interleaving said n synchronized data signals into blocks of length 1+m, each comprising m data bits followed by one control bit, where m is a highly composite number;
      a fixed number S of said blocks being concatenated into a subframe;
      corresponding control bits in each subframe being reserved for multiframe marker and bit-stuff indication;
      n of said subframes being concatenated into a multiframe;
      said bit stuff indication in each of the n subframes being reserved for passing synchronization information for one of the n synchronized data signals;
      said multiframe marker in one of the subframes being recognizably different from the multiframe marker in the others, to facilitate identification of the bit-stuff indication in that subframe with a particular one of said synchronized data signals;
   (d) a digital transmission channel for coupling said multiplexed bit stream and said transmit clock from the output of said multiplexing means at said first location to a second location as received bits and received clock, respectively;
   (e) demultiplexing means at said second location comprising:
      second means for selecting the number n, said demultiplexing means separating said received bits into output data signals and stuff indications;
   (f) n signal desynchronizers, which accept the output data signals from said n demultiplexer outputs respectively, discard bits that occur when destuff indications from their corresponding synchronizers are active, and elastically store the remaining bits to smooth out the discontinuities resulting from the input bits being discarded; and
   (g) n signal output terminals from said n signal desynchronizers, respectively.

2. The system set forth in claim 1 wherein said multiplexing means comprises:
   (a) a transmit clock, that operates at a rate, $f_t$, equal to the product of said nominal data rate, an overhead factor, and said selectable number, n;
   (b) a transmit bit counter, which is a binary divider of modulus B, to which said transmit clock is coupled and which produces one output of frequency $f_t/B$;
   (c) a block counter, which is a binary divider of modulus S, to which the output of the transmit bit counter is coupled and which produces an output of frequency $f_t/BS$;
   (d) a subframe counter, which is a binary divider that counts successively through a selectable number, n, of states, to which the output of the block counter is coupled and which has a parallel output specifying its state;
   (e) a subframe decoder, for recognizing each state of the subframe counter, to which the parallel output of the subframe counter is coupled and which activates one of n outputs corresponding to the present state of the subframe counter;
   (f) a data bit counter, which is a binary divider that counts successively through a selectable number, n, of states, driven by said transmit clock, periodically restarted at frequency $f_t/B$ by the output of the transmit bit counter, and having a parallel output specifying its state;
   (g) a data bit decoder, for recognizing each of the states of the data bit counter, to which the parallel output of the data bit counter is coupled and which activates one N outputs corresponding to the present state of the data bit counter;
   (h) a data bit selector having N data inputs and an output, one input of which is selected for coupling through to said output, according to which data bit decoder output is active;
   (i) a control bit multiplexer that comprises:
      a selector of control bits, operating at the block rate, the control bits being selected, according to a framing rule, from among fixed frame markers; multiframe markers; and stuff indications;

said framing rule encoding the multiframe marker in one of the subframes to be recognizably different from the corresponding markers in the other subframes of the multiframe to allow subframe identification;

said control bit multiplexer being clocked by the output from the transmit bit counter and providing the selected control bit in its output; and (j) a transmit bit selector, having a data bit input from the data bit selector, a control bit input from the control bit multiplexer, an end-of-block input from the transmit bit counter, and an output, for selecting either a data bit or a control bit, the control bit being selected at the end of the block and the selected bit being provided in its output.

3. The system set forth in claim 2, wherein said demultiplexing means comprises:

(a) input means for receiving the multiplexed bit stream and transmit clock from the digital channel as received bits and received clock, respectively;

(b) a receive bit counter, which is a dual-modulus binary divider, one of which moduli is B, which is used after frame acquisition, the other of which is used during frame acquisition when a skip signal from a frame synchronizer is active, to which the received clock is coupled and which produces an output of frequency $f_t/P$, where P is the current modulus;

(c) a block counter, which is a binary divider of modulus S, to which the output of the receive bit counter is coupled, which produces an output of frequency $f_t/PS$, and which has a parallel output specifying its state;

(d) a subframe counter, which is a dual-modulus binary divider, one of which moduli is selectable, set to modulus n, and used after multiframe acquisition, the other of which is used during multiframe acquisition when a skip signal from a multiframe synchronizer is active, to which the output of the block counter is coupled and which has a parallel output specifying its state;

(e) a subframe decoder, for recognizing each state of the subframe counter, to which the parallel output of the subframe counter is coupled and which activates one of n outputs according to the present state of the subframe counter;

(f) a data bit counter, which is a binary divider that counts successively through a selectable number, n, of states, driven by said receive clock, periodically restarted by the output of the bit counter, and having a parallel output specifying its state;

(g) a data bit decoder, for recognizing each of the states of the data bit counter, to which the parallel output of the data bit counter is coupled and which activates one of N outputs according to the present state of the data bit counter;

(h) a data bit distributor having a data input, which couples said input through to one of N outputs according to which data bit decoder output is active;

(i) a receive bit demultiplexer, which comprises a distributor of data bits, frame markers, multiframe markers, and destuff indicators, which operates according to said framing rule, which is clocked by the received clock, and which has two parallel counter-state inputs, one from the block counter and one from the subfame counter, for synchronizing distribution of the control bits and multiframe markers and providing data bits, frame markers, multiframe markers, and destuff indications in its output;

(j) a frame synchronizer, to which the frame markers from said receive bit demultiplexer are coupled and which processes them in synchronism with the output of the block counter, said frame synchronizer producing a skip signal in its output in response to incorrect frame markers; and (k) a multiframe synchronizer, to which the multiframe markers from the receive bit demultiplexer are coupled and which processes them in synchronism with the output of the subframe counter, said multiframe synchronizer producing a skip signal in its output in response to incorrect multiframe markers.

* * * * *